United States Patent
Roodenburg et al.

(10) Patent No.: US 8,308,245 B2
(45) Date of Patent: Nov. 13, 2012

(54) AMUSEMENT DEVICE SEAT ASSEMBLY

(75) Inventors: Joop Roodenburg, Delft (NL); Willem Johan Philippen, Schinveld (NL); Iris Van Noorden, Maastricht (NL)

(73) Assignee: Vekoma Rides Engineering B.V., Vlodrop (NL)

( * ) Notice: Subject to any disclaimer, the term of this patent is extended or adjusted under 35 U.S.C. 154(b) by 222 days.

(21) Appl. No.: 12/666,999

(22) PCT Filed: Jun. 29, 2007

(86) PCT No.: PCT/NL2007/000164
§ 371 (c)(1),
(2), (4) Date: Jul. 9, 2010

(87) PCT Pub. No.: WO2009/005337
PCT Pub. Date: Jan. 8, 2009

(65) Prior Publication Data
US 2012/0068521 A1    Mar. 22, 2012

(51) Int. Cl.
*B60R 21/00*    (2006.01)

(52) U.S. Cl. ........................... 297/487; 297/488

(58) Field of Classification Search .................. 297/487, 297/488
See application file for complete search history.

(56) References Cited

U.S. PATENT DOCUMENTS

| | | | | |
|---|---|---|---|---|
| 1,597,491 A * | 8/1926 | Traver | ........................... | 104/241 |
| 3,165,357 A * | 1/1965 | Ruedemann, Jr. | ........ | 297/488 X |
| 3,722,951 A * | 3/1973 | Ezquerra | ........................ | 297/488 |
| 4,175,786 A * | 11/1979 | Schaller et al. | ........... | 297/487 X |
| 4,900,086 A * | 2/1990 | Steward | ..................... | 297/488 X |
| 5,129,478 A * | 7/1992 | Suenaga et al. | ........... | 297/487 X |
| 5,427,432 A * | 6/1995 | Meeker et al. | ............. | 297/488 X |
| 5,433,153 A * | 7/1995 | Yamada | ........................... | 104/63 |
| 5,499,844 A * | 3/1996 | Dirck | ........................ | 297/487 X |
| 5,529,382 A | 6/1996 | Burkat | | |
| 5,779,319 A | 7/1998 | Merrick | | |
| 6,620,051 B2 * | 9/2003 | Kroon et al. | ..................... | 472/31 |
| 6,637,341 B2 * | 10/2003 | Kroon et al. | .................... | 104/53 |
| 7,204,559 B2 * | 4/2007 | Berra | ........................ | 297/487 X |
| 7,506,602 B2 * | 3/2009 | Blum et al. | ............... | 297/487 X |
| 7,694,640 B2 * | 4/2010 | Blum et al. | ............... | 297/487 X |
| 8,132,514 B2 * | 3/2012 | Lubman et al. | ............... | 104/241 |
| 2002/0070599 A1 * | 6/2002 | Berra | ............................. | 297/466 |

FOREIGN PATENT DOCUMENTS

| | | |
|---|---|---|
| CH | 694 800 A5 | 7/2005 |
| EP | 1 059 207 A1 | 12/2000 |
| EP | 1 394 003 A2 | 3/2004 |
| WO | WO-2006/120029 A1 | 11/2006 |

* cited by examiner

*Primary Examiner* — Rodney B White
(74) *Attorney, Agent, or Firm* — Birch, Stewart, Kolasch & Birch, LLP (57) ABSTRACT

An amusement device seat includes a seat and a bar construction, moveable between an access position to a passenger fixation position, in which the passenger is fixed in the seat. The assembly further includes a locking device to lock the bar construction at the passenger fixation position. The locking device includes an engagement device to engage and disengage with the bar construction and a guide for the engagement device allowing the engagement device to assume an engagement position between the access position and the passenger fixation position, and allowing the engagement device and the engaged bar construction to move between the engagement position to the passenger fixation position. The locking device includes a fixation device for fixing the engagement device and the engaged bar construction at multiple passenger fixation positions along the guide to accommodate passengers of different sizes.

22 Claims, 6 Drawing Sheets

AMUSEMENT DEVICE SEAT ASSEMBLY

BACKGROUND OF THE INVENTION

The invention relates to an amusement device seat assembly, comprising a seat adapted to accommodate a passenger, a bar construction, which is moveable between an access position allowing passengers to take place in the seat, to a passenger fixation position, in which the passenger is fixed in the seat, and locking means connected to the seat to lock the bar construction in the passenger fixation position.

This type of amusement device seat assembly is well known from the art and applied in many amusement devices such as roller coasters, both in fairgrounds and in amusement parks. An example of such an amusement device seat assembly is described in WO 2006/120029 of the same applicant.

SUMMARY OF THE INVENTION

The object of the present invention is to provide an improved amusement device seat assembly.

This objective is achieved by an amusement device seat assembly comprising a seat adapted to accommodate a passenger, a bar construction, which is moveable between an access position allowing passengers to take place in the seat, to a passenger fixation position, in which the passenger is fixed in the seat, and locking means connected to the seat to lock the bar construction in the passenger fixation position, wherein the locking means comprise engagement means to engage and disengage with the bar construction, a guide for the engagement means allowing the engagement means to assume an engagement position between the access position and the passenger fixation position, and allowing the engagement means and the engaged bar construction to move between the engagement position and the passenger fixation position, and fixation means for fixing the engagement means and the engaged bar construction at multiple passenger fixation positions along the guide to accommodate passengers of different sizes.

According to the invention, the engagement means engage with the bar construction at a first position, and the engagement means and the engaged bar construction are fixed at a second position. The advantage of the provision of these different steps is that the engagement of the engagement means with the bar construction can take place at any predefined position, which may be suited to the construction of the amusement device seat assembly. This engagement position is preferably located remote from a passenger seated in the seat, such that the passenger is still relatively free to move in the seat. The fixation means according to the invention allow the fixation of the engagement means and the engaged bar construction at a variable passenger fixation position. The range of passenger fixation positions is in particular beneficial, since this allows many types of passengers to be fixed properly in the seat, with the engagement means and the engaged bar construction at a passenger fixation position which is tailored to the passenger. For large-sized passengers, the bar construction will be fixed at a passenger fixation position further remote than a passenger fixation position for small-sized passengers. According to the invention, fixation of the engagement means can either take place at various discrete passenger fixation positions, or at a continuous, stepless range of passenger fixation positions.

In a preferred embodiment, the fixation means comprise a cylinder, such as a hydraulic, pneumatic or gas cylinder. A cylinder typically comprises a barrel divided into two 'chambers' by a piston, moveable together with a piston rod. The engagement means may be connected to this moveable piston rod. The cylinder may be operable such that the piston is allowed to be fixed at any position, as a result of which the engagement means can be fixed at any position. This allows stepless locking of the bar construction. The cylinder can fixed at a position by preventing the piston to move, e.g. by preventing hydraulic fluid or gas to enter or leave one or both of the chambers of the cylinder, which may be accomplished by valves. An advantage of using a cylinder as fixation means is that the cylinder may also be operated as drive means to move the bar construction between the engagement position and the passenger fixation position.

The cylinder is preferably operated by a solenoid valve. In a specific embodiment, the solenoid valve allows the piston to move in the direction from the engagement position to the passenger fixation position. Moving in the other direction is not possible. Subsequently, during the ride, the solenoid valve prohibits any movement of the piston, and hence of the engagement means engaged with the bar construction. When the passenger is allowed to leave the amusement device seat assembly, the solenoid valve may be energised such that movement of the piston in the direction from the passenger fixation position to the engagement position is allowed.

Alternatively, the fixation means may be positioned at discrete positions in the guide to fix the engagement means and the engaged bar construction at discrete passenger fixation positions, depending on the size of the passenger. The fixation means may e.g. comprise fixation pins.

The guide for the engagement means according to the invention should allow the engagement means to engage or disengage with the bar construction at an engagement position, and subsequently allow the engagement means and the engaged bar construction to move between the engagement position and the passenger fixation position.

In a preferred embodiment the guide is designed such that it can only guide the engagement means in the position in which the bar construction is locked. In this embodiment, the engagement means are unlocked to engage with the bar construction at the engagement position, followed by locking the bar construction also at the engagement position. Subsequently, the bar construction is allowed to move to the passenger fixation position, while the bar construction is locked by the closed engagement means, which are guided by the guide. The bar construction may stop moving at the passenger fixation position. This is advantageous because in whichever passenger fixation position beyond the engagement position the bar construction stops moving, the bar construction is locked. Another advantage is that any forces exerted on the locked bar construction are immediately transferred from the engagement means to the guide. In a preferred embodiment, the guide is integrated in a lumbar support of the seat. Then, the forces are again transmitted to the lumbar support. Alternatively, the guide may be provided extending from the seating surface or from the back support.

Hence, in a preferred embodiment the seat may comprise lumbar supports to which the engagement means and the guide for the engagement means are connected. Alternatively, the engagement means and the guide may be connected to the seating surface, preferably between the tights of the passenger. An advantage of engagement means connected to both lumbar supports is that the bar construction is locked by two distinct engagement means. In general, it is often required that seats for amusement devices are locked by at least two distinct mechanisms. In an embodiment in which the engagement means are positioned between the tights of the passenger, this may alternatively be accomplished by also locking the bar construction at the pivot axis, blocking any further pivoting movement of the bar construction.

The seat of the amusement device seat assembly according to the invention is adapted to accommodate at least one passenger. The seat could be designed to accommodate multiple passengers.

In a possible embodiment the engagement means comprise recesses for protruding parts of the bar construction. Alternatively, the engagement means may comprise gripping means being moveable between an opened position, in which they engage with the bar construction, and a closed position in which the bar construction is locked. Such gripping means may e.g. be formed by claws.

Preferably, the bar construction itself does not comprise locking parts. The advantage of engagement means engaging with such a bar construction is that locking parts on the bar construction may be dangerous for the passenger, e.g. if they are moveable or sharp, and may be susceptible to wear or demolition, and may also be vulnerable.

The bar construction may be moved from the access position to the engagement position by drive means. Preferably, the bar construction is further moved from the engagement position to the passenger fixation position manually. Alternatively, the bar construction is moved further by the same drive means, or by separately provided drive means. This movement from the engagement position to the passenger fixation position should be actuated with care to prevent squeezing of the passenger by the bar construction.

A preferred embodiment of an amusement device seat assembly according to the invention comprises a seat having a seating surface and a back support, and further comprises a pivot axis extending in the vicinity of the back support and remote from the seating surface, which pivot axis is substantially parallel to the back support and substantially parallel to the seating surface, and wherein the bar construction comprises a hip bar and one or more pivot arms, which pivot arm extends between the pivot axis and the hip bar, which bar construction is pivotable about the pivot axis to and from the passenger fixation position in which the hip bar is in the vicinity of the seating surface, so as to extend over the lap of a person seated in the amusement device seat assembly. So far the seat assembly resembles the seat assembly disclosed in WO2006/120029.

In a preferred embodiment, a belt construction is connected to the back support and to the bar construction, comprising at least two shoulder straps. The connection of the belt construction with the back support is preferably adjustable, so that the belt construction can be fixed to the back support in multiple positions with varying height.

The invention also relates to a method for locking a passenger in a passenger fixation position in a seat of an amusement device seat assembly, comprising the following steps:
  moving the bar construction from the access position to the engagement position,
  engaging the engagement means to the bar construction,
  moving the engagement means and the engaged bar construction from the engagement position to the passenger fixation position,
  fixing the engagement means and the engaged bar construction at the passenger fixation position.

The invention also relates to a method for locking a passenger in a passenger fixation position in a seat of an amusement device seat assembly, comprising the following steps:
  releasing the engagement means and the engaged bar construction from the passenger fixation position.
  moving the engagement means and the engaged bar construction from the passenger fixation position to the engagement position,
  disengaging the bar construction from the engagement means,
  moving the bar construction from the engagement position to the access position.

BRIEF DESCRIPTION OF THE DRAWINGS

The invention is further explained with reference to the drawings, in which.

DETAILED DESCRIPTION OF THE DRAWINGS

In FIGS. 1-4 an amusement device seat assembly 1 according to the invention is shown. The amusement device seat assembly 1 comprises a seat 2, capable of accommodating a person, comprising a seating surface 2a and a back support 2b. A pivot axis 3 extends in the vicinity of the back support 2b and remote from the seating surface 2a, which pivot axis 3 is substantially parallel to the back support 2b and substantially parallel to the seating surface 2a. A bar construction 4 comprises a hip bar 4a and one or more pivot arms 4b. The pivot arm 4b extends between the pivot axis 3 and the hip bar 4a.

Figure 1:
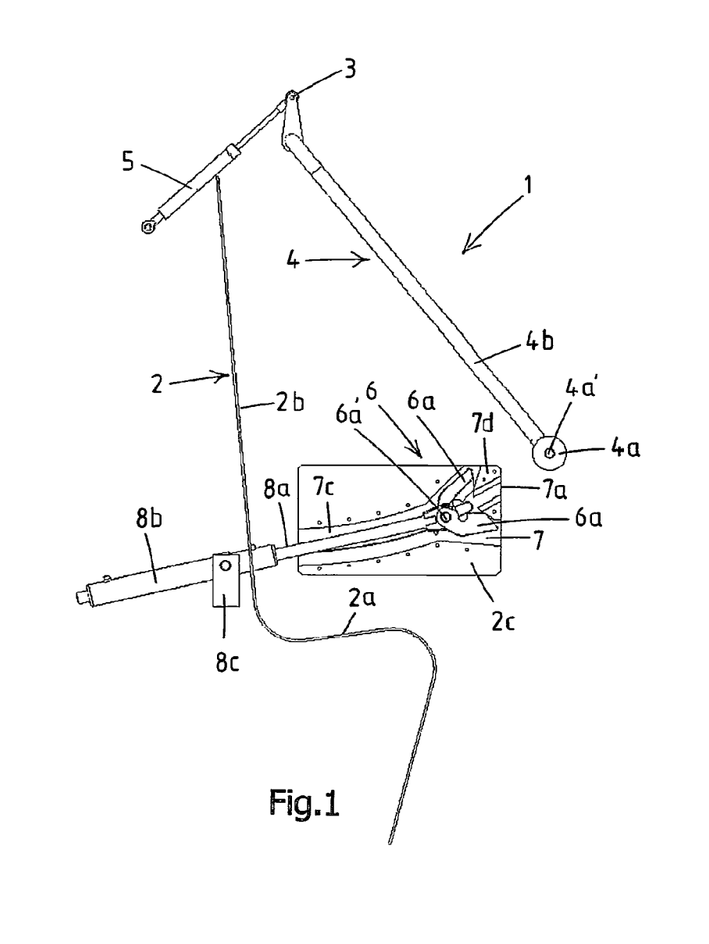
FIG. 1 is a schematic representation of the cross section of a first embodiment of an amusement device seat assembly according to the invention with the bar construction in a access position.
Figure 2:
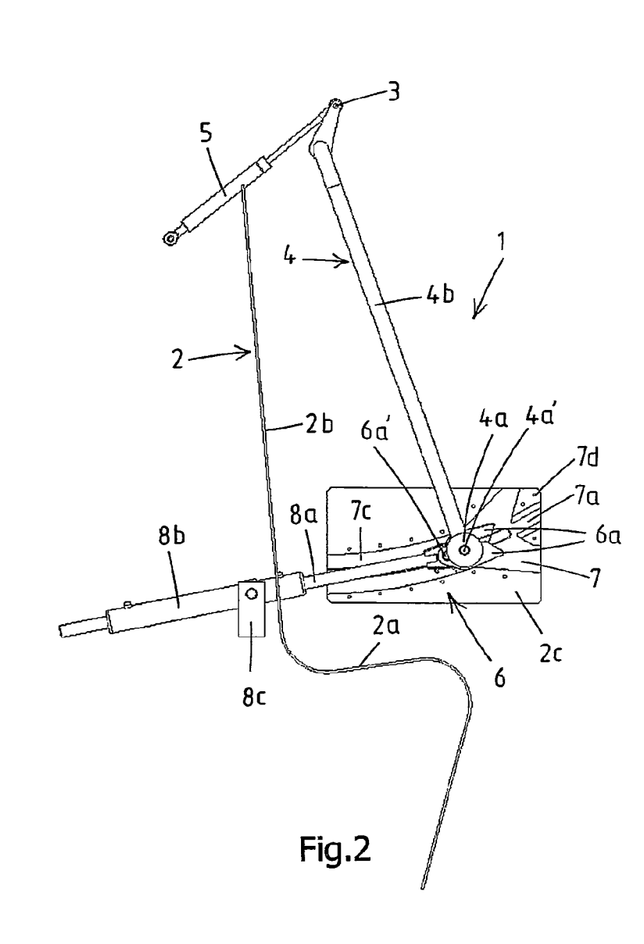
FIG. 2 is a schematic representation of the cross section of the first embodiment of an amusement device seat assembly according to the invention with the bar construction in a passenger fixation position.
Figure 3A:
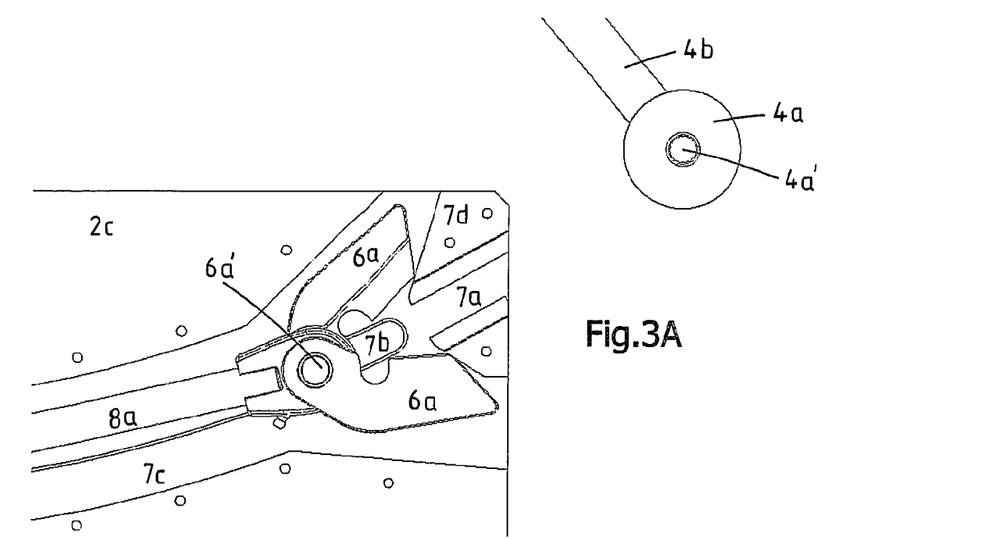
FIGS. 3a-3c are schematic representations of details of the cross section of the first embodiment of an amusement device seat assembly according to the invention.
Figure 3B:
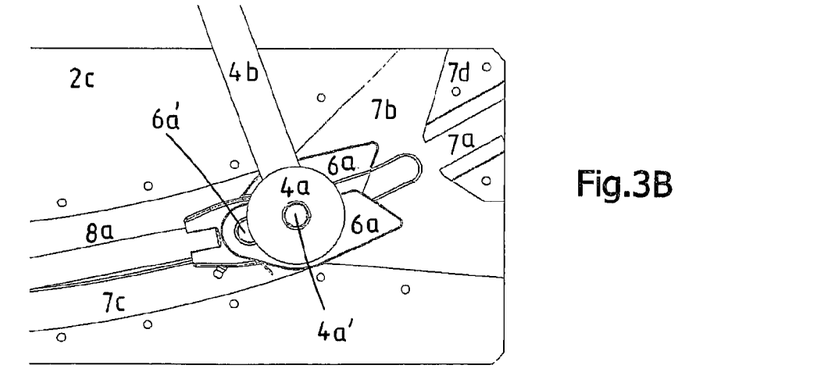
Figure 3C:
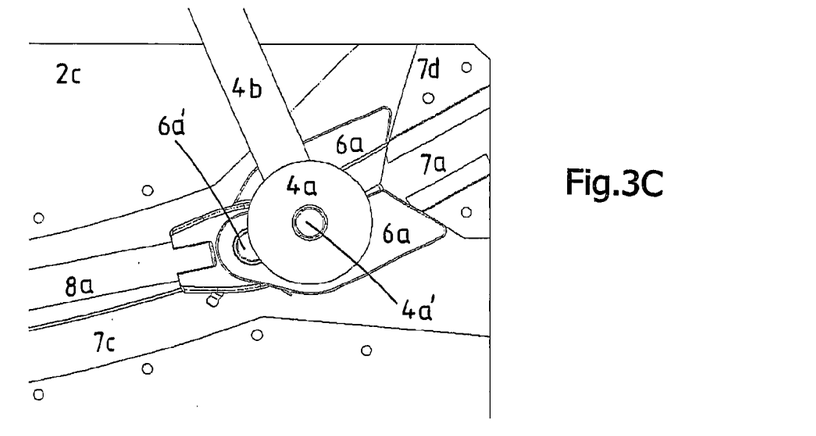
Figure 4:
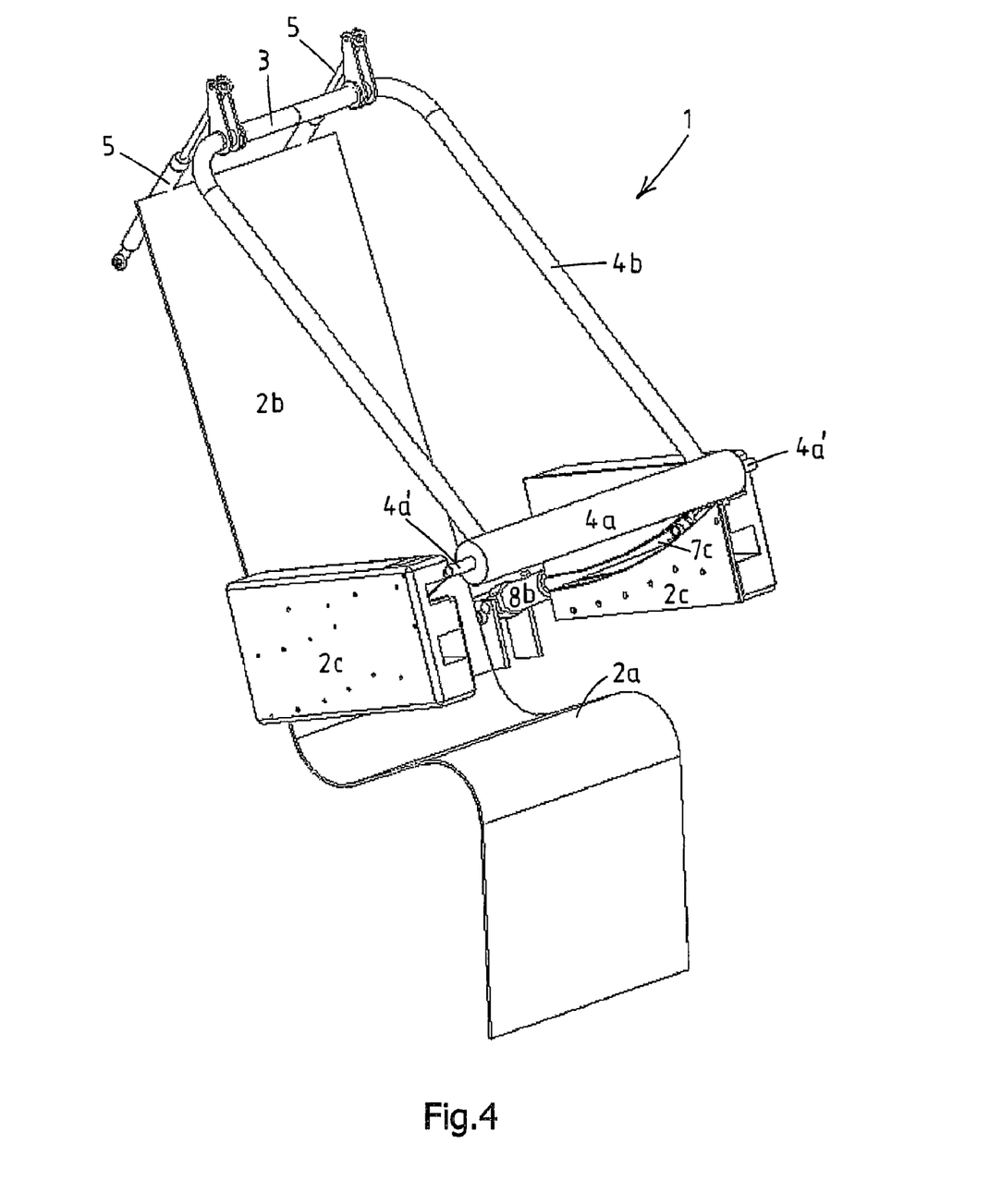
FIG. 4 is a perspective view of the first embodiment.

FIG. 1 shows the seat assembly with the bar construction 4 in an access position, the bar construction 4 being remote from a passenger seated in the seat (not shown). In FIG. 3a the position of the locking means according to the invention in the access position is shown. FIG. 2 shows the seat assembly 1 in a passenger fixation position, in which the passenger (not shown) is fixed in the seat. In FIG. 3b the position of the locking means according to the invention in a passenger fixation position is shown. In FIG. 3c the locking means according to the invention are shown in the engagement position, still engaged with the bar construction 4 but about to disengage. FIG. 4 shows the seat assembly 1 in perspective.

The bar construction 4 is pivotable via pivot drive means 5, in this embodiment a cylinder, about the pivot axis 3 from an access position in which the hip bar 4a is raised from the seating surface 2a such that a person can sit down in the amusement device seat assembly 1 to a passenger fixation position, in which the hip bar 4a is in the vicinity of the seating surface 2a, so as to extend over the lap of a person seated in the amusement device seat assembly. The position shown in FIG. 2 is a passenger fixation position.

The shown amusement device seat assembly 1 further comprises locking means, comprising engagement means 6, which are in this embodiment connected to arm support 2c for engaging with the hip bar 4a. Alternatively, engagement means 6 are connected to another part of the seat, such as the back support 2b, the seating surface 2a or a lumbar support. In an alternative embodiment (not shown), the engagement means 6 may engage with the pivot arms 4b instead of with the hip bar 4a. In the shown embodiment, the engagement means 6 engage with a protruding part 4a' of the hip bar, having a smaller diameter than the hip bar 4a. Alternatively, the engagement means 6 engage directly with part of the hip bar 4a.

Engagement means 6 are shown opened FIG. 3a, ready to engage with the protruding part 4a' of the hip bar 4a at an engagement position of the bar construction 4 between the access position and the passenger fixation position. Engagement means 6 comprise gripping means 6a being moveable between an opened, unlocked position (shown in FIG. 3a), in which they can engage with the protruding part 4a' of the hip bar 4a, and a closed, locked position (shown in FIGS. 3b and 3c) in which the protruding part 4a' of the hip bar 4a is locked. Gripping means 6a are designed as claws, pivotable about an axis 6a'.

Gripping means 6a are moveable with the engaged protruding hip bar part 4a' from the engagement position (shown in FIG. 3a) to the passenger fixation position (FIG. 3b) in a guide 7. Guide 7 comprises recesses 7a for protruding hip bar parts 4a', extending over some extent of the pivot direction of the bar construction 4. These recesses 7a allow the bar construction 4 to move to the engagement position. Guide 7 further comprises a cavity part 7b, in which the protruding hip bar parts 4a' can engage with the gripping means 6a. Recesses 7c allow the engagement means 6 with the engaged bar construction 4 to pivot from the engagement position (as shown in FIG. 1b) to a range of passenger fixation positions. Recesses 7c are a continuation of recesses 7a for the protruding hip bar parts 4a', between which cavity part 7b is located to allow engagement and disengagement of bar construction. The recess 7c of guide 7 is designed such that it only guides the gripping means 6a in the closed position in which the protruding hip bar parts 4a' are locked. In the situation shown in FIG. 3c, the engagement means 6a are allowed to open, which opening movement is induced by guide parts 7d.

Amusement device seat assembly 1 further comprise fixation means 8 to fix the gripping means 6a at the passenger fixation position. In the shown embodiment, fixation means 8 comprise a cylinder 8b, in which cylinder 8b a piston rod 8a is moveable to which the gripping means 6a are connected. The piston rod 8a is connected to a piston (not shown) in the cylinder 8b, which is moveable throughout the cylinder by filling or emptying chambers adjacent the piston with air (pneumatic cylinder), hydraulic fluid (hydraulic cylinder) or any other fluid or gas. The operation of the cylinder is controlled by a solenoid valve 8c, which can be actuated so as to allow any movement of the piston, or fixation of the piston, or movement of the piston in one direction only. The solenoid valve 8c may be controlled so as to allow the piston and the connected piston rod and gripping means 6a only inwards, to the left in FIG. 1a, thereby moving the hip bar 4a closer to the body of the passenger (not shown), and not outwards, to the right, removing the hip bar 4a from the passenger. During the ride, the solenoid valve 8c is operated such that the piston is fixed, and also the gripping means. After the ride, the solenoid valve 8c is operated such that the piston, piston rod and gripping means 6a can move outwards, to the right in FIG. 1c, away from the passenger in the seat 2 such that he can leave the amusement device seat assembly 1.

Figure 5A:
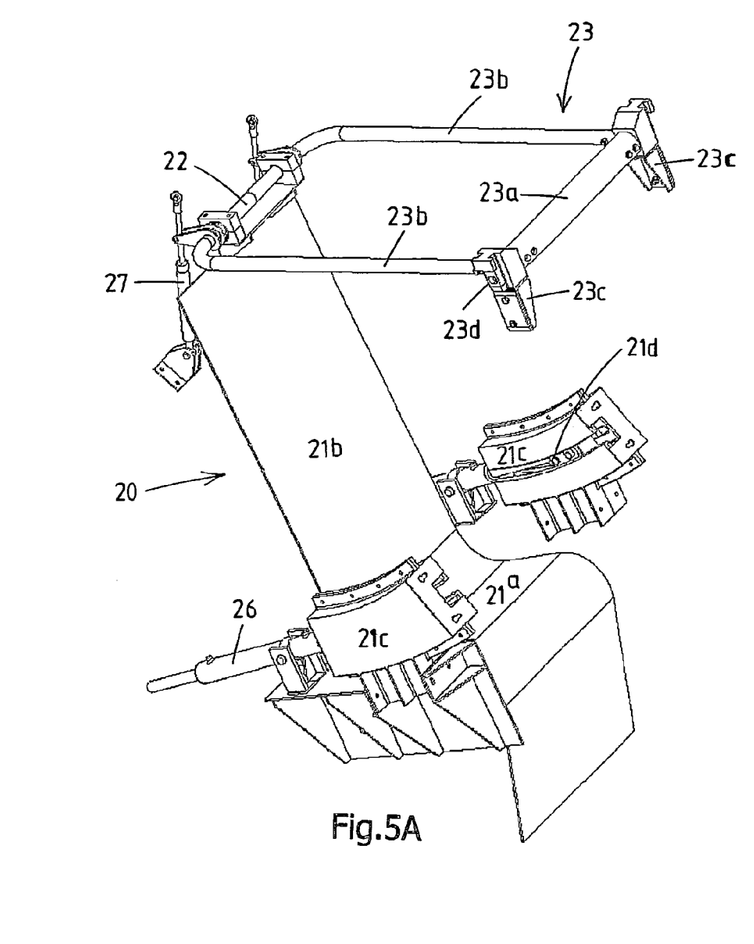
FIGS. 5a and 5b are schematic representations of the cross section of a second embodiment of an amusement device seat assembly according to the invention with the bar construction in a access position (FIG. 5a) and with the bar construction in an engaged position (FIG. 5b)
Figure 5B:
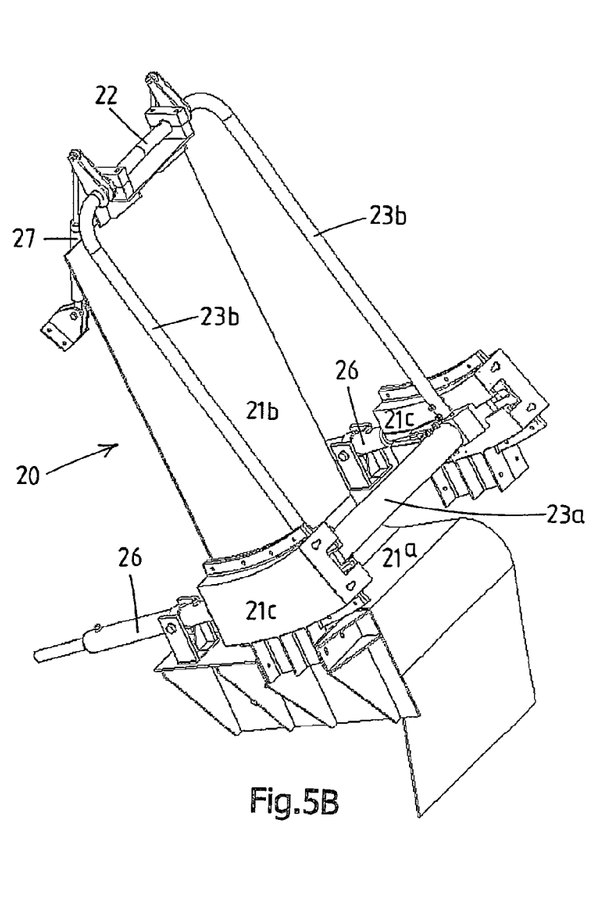
Figure 6A:
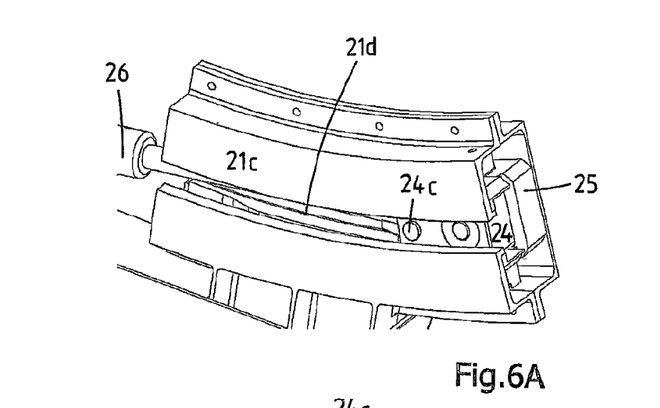
FIGS. 6a-6d are schematic representations of details of the cross section of the second embodiment of an amusement device seat assembly according to the invention.
Figure 6B:
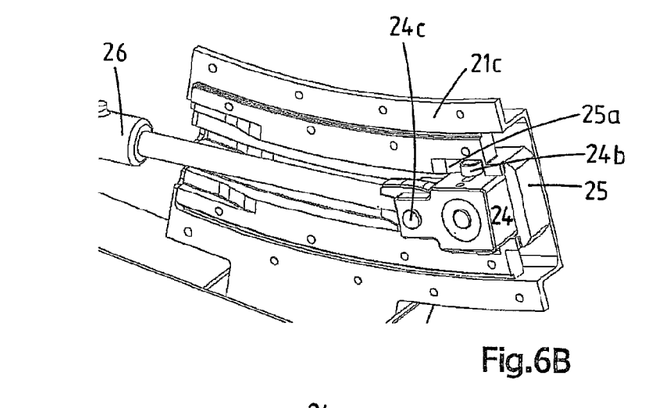
Figure 6C:
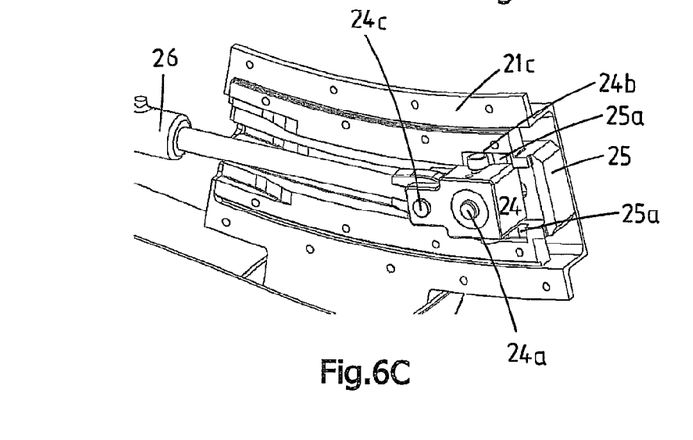
Figure 6D:
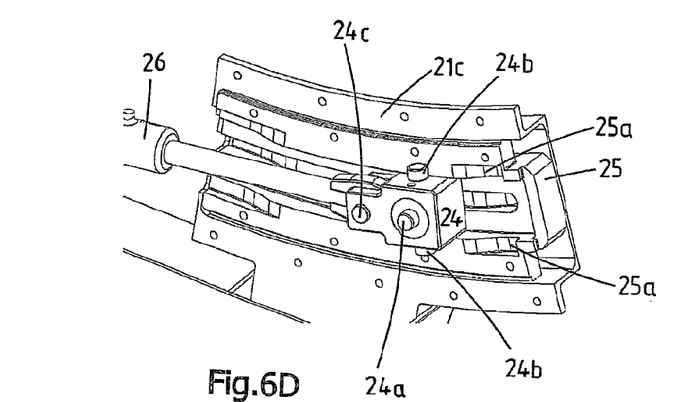
Figure 7:
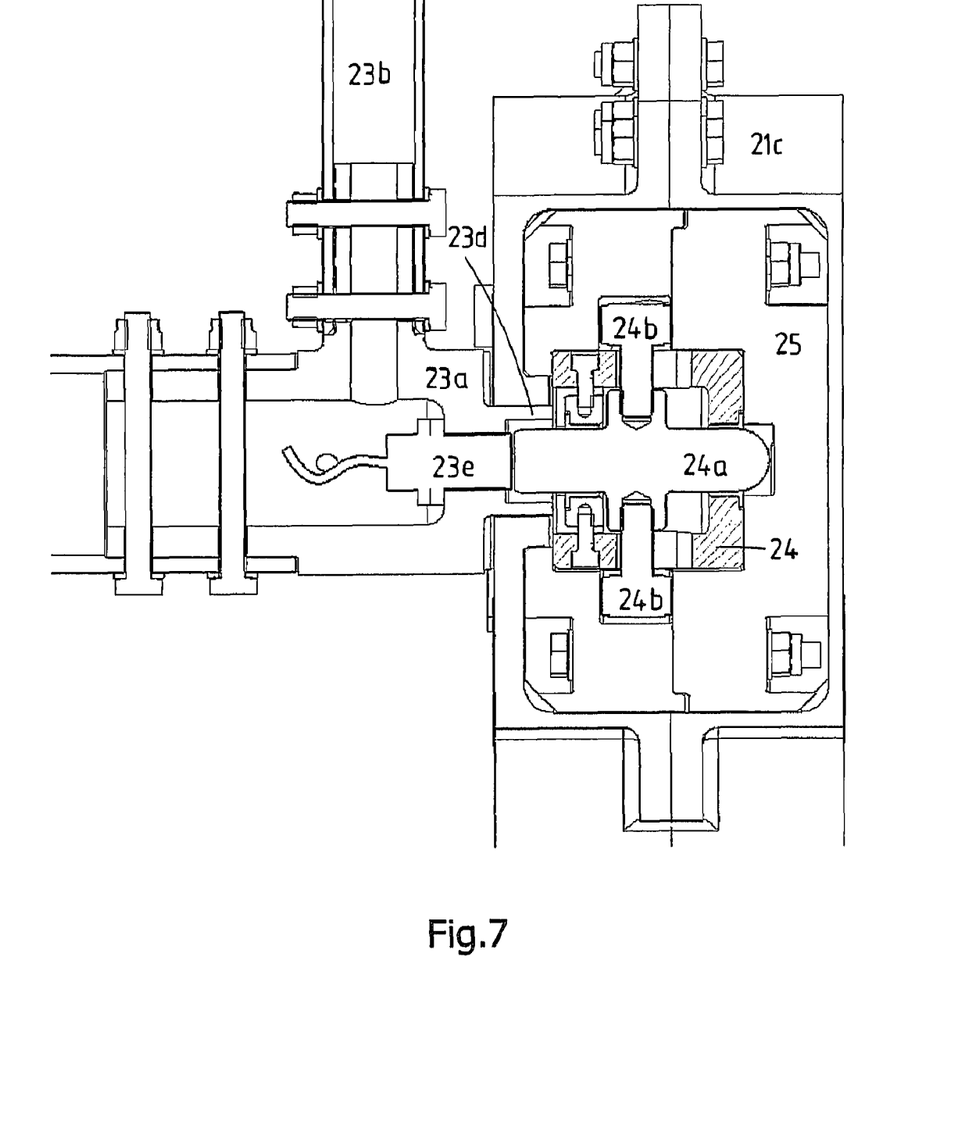
FIG. 7 is a detail of the engagement means according to the invention.

An alternative embodiment of an amusement device seat assembly 20 is shown in FIGS. 5-7. Amusement device seat assembly 20 comprises a seat 21 capable of accommodating a passenger (not shown). The seat 21 comprises a seating surface 21a and a back support 21b. A pivot axis 22 extends in the vicinity of the back support 21b and remote from the seating surface 21a, which pivot axis 22 is substantially parallel to the back support 21b and substantially parallel to the seating surface 21a. The seat 21 comprises two arm supports 21c.

Seat assembly 20 further comprises a bar construction 23. Bar construction 23 comprises a hip bar 23a and two pivot arms 23b, which pivot arms 23b extend between the pivot axis 22 and the hip bar 23a. The bar construction 23 is pivotable about the pivot axis 22 between an access position, shown in FIG. 5a, remote from the passenger seated in the seat 21, and a passenger fixation position, shown in FIG. 5b, in which the passenger (not shown) is fixed in the seat 21. Such movement is controlled by a cylinder 27. In the embodiment shown in FIG. 5b in the passenger fixation position the hip bar 23a is in the vicinity of the seating surface 21a, so as to extend over the lap of a person seated in the amusement device seat assembly 20.

Seat assembly 20 further comprises engagement means 24 connected to the arm supports 21c of the seat 21 to lock the bar construction 23 at least at the passenger fixation position. The position of engagement means 24 in the arm support 21c is shown in detail in FIGS. 6a-6d. A lock housing 25 is connected to the arm support 21c, forming a guide for engagement means 24. Engagement means 24 are slidable in the guide 25 in the pivot direction of the bar construction 23. Lock housing 25 primarily allows the engagement means 24 to engage and disengage with the bar construction 23 at an engagement position (FIGS. 6a and 6b) between the access position (FIG. 5a) and the passenger fixation position (FIG. 5b). Subsequently, the guide 25 allows engagement means 24 and engaged bar construction 23 to move between an engagement position (FIGS. 6a and 6b) and the passenger fixation position (FIGS. 5b and 6d and 7). The sliding movement is controlled by a cylinder 26, one end of which is connected to the engagement means 24 via a pin 24c. Lock housing 25 comprises recesses 25a interacting with moveable protrusions 24b on the engagement means 24. Engagement means 24 comprise a moveable pen 24a, moveable between a retracted and a protruded position. The position of the pen 24a is dependent on the interaction between recesses 25a of the lock housing 25 and the protrusions 24b on the engagement means 24. In protruded position pen 24a of the engagement means 24 engage with a recess 23d of the bar construction 23. Arm support 21c comprises a slit 21d for the bar construction to pivot in the arm support 21c.

The operation of seat assembly 20 is as follows. Bar construction 23 is allowed to pivot downwards from the access position shown in FIG. 5a to an engagement position. In the engagement position, the engagement means 24 are positioned as shown in FIGS. 6a and 6b. In the engagement position the moveable pen 24a is retracted, allowing the bar construction part 23c to enter the lock housing 25. After entering the lock housing 25, the bar construction part 23c upon further movement pushes the engagement means 24 further into the housing 25 in the pivot direction of the bar construction 23, as a result of which the protrusions 24b of engagement means 24 follow the recesses 25a of the housing 25. Since these recesses are only present in a small part of the housing 25, engagement means 24 are forced in a direction transverse to the moving direction. Thereby the moveable pin 24a is moved from the retracted position (as shown in FIGS. 6a and 6b) to the protruded position (shown in FIGS. 6c and 6d) in which it engages with the recess 23d in the bar construction 23, thereby locking the bar construction. Upon movement from the fixation position to the engagement position, the protrusion 24b will follow the contour of the lock housing 25 and its recesses 25a, as a result of which the protrusions 24b move the moveable pin 24a to the retracted position, allowing the bar construction 23 to disengage.

The sliding movement of the engagement means 24 is controlled by cylinder 26. Cylinder 26 is according to the invention actuated as fixation means, capable of fixing the engaged engagement means 24 and the engaged bar construction 23 at a passenger fixation position, which passenger fixation position is variable, being dependent on the size of the passenger. Preferably, the cylinder 26 is actuated such as to allow the engagement means 24 to be fixed in a stepless manner.

The details of the embodiment of seat assembly 20 shown in FIG. 7 show the preferred application of a sensor 23e in the bar construction, detecting the engagement of the recess 23d of the bar construction 23 with the moveable pen 24a of the engagement means 24.

The invention claimed is:

1. An amusement device seat assembly, comprising:
   a seat adapted to accommodate a passenger;
   a bar construction, said bar construction being moveable in a locking direction from an access position allowing passengers to take place in the seat, to a passenger fixation position, in which the passenger is fixed in the seat, and vice versa; and
   a locking device connected to the seat to lock the bar construction in the passenger fixation position, wherein the locking device comprises:
      an engagement device configured to engage and disengage with the bar construction;
      a guide for the engagement device allowing the engagement device, engaged with the bar construction, to assume an engagement position, situated between the access position and the passenger fixation position, and allowing the engagement device and the engaged bar construction to move in the locking direction from the engagement position to the passenger fixation position, and vice versa; and
      a fixation device configured to fix the engagement device and the engaged bar construction at multiple passenger fixation positions along the guide to accommodate passengers of different sizes.

2. The assembly according to claim 1, wherein the fixation device comprises a cylinder, to one end of which the engagement device is connected to allow the engagement device to be fixed in a stepless manner.

3. The assembly according to claim 1, wherein the engagement device locks the bar construction at the engagement position and is subsequently guided to the passenger fixation position.

4. The assembly according to claim 1, wherein the engagement device engages with the bar construction at the engagement position and locks the bar construction being guided by the guide between the engagement position and the passenger fixation position.

5. The assembly according to claim 1, wherein the seat comprises a seating surface and a back support.

6. The assembly according to claim 5, further comprising a pivot axis extending in the vicinity of the back support and remote from the seating surface, the pivot axis being substantially parallel to the back support and substantially parallel to the seating surface, and wherein the bar construction comprises a hip bar and one or more pivot arms, the pivot arm extending between the pivot axis and the hip bar, the bar construction being pivotable about the pivot axis to and from the passenger fixation position in which the hip bar is in the vicinity of the seating surface, so as to extend over the lap of a person seated in the amusement device seat assembly.

7. The assembly according to claim 6, wherein the engagement device engages with the hip bar or one or more pivot arms.

8. The assembly according to claim 1, in which the seat comprises two arm supports to which the locking device is connected.

9. The assembly according to claim 1, wherein the engagement device comprises a gripping device being moveable between an opened position, in which the gripping device engages with the bar construction, and a closed position in which the bar construction is locked.

10. The assembly according to claim 1, wherein the guide only guides the engagement device in the position in which the bar construction is locked.

11. The assembly according to claim 1, wherein the engagement device comprises a recess for protruding parts of the bar construction.

12. A method for locking a passenger in a passenger fixation position in a seat of the amusement device seat assembly according to claim 1, said method comprising the following steps:
   moving the bar construction in the locking direction from the access position to the engagement position;
   engaging the engagement device to the bar construction;
   moving the engagement device and the engaged bar construction from the engagement position to the passenger fixation position in the locking direction; and
   fixing the engagement device and the engaged bar construction at the passenger fixation position.

13. The method for unlocking a passenger from a seat of the amusement device seat assembly according to claim 1, further comprising the following steps:
   releasing the engagement device and the engaged bar construction from the passenger fixation position;
   moving the engagement device and the engaged bar construction from the passenger fixation position to the engagement position;
   disengaging the bar construction from the engagement device; and
   moving the bar construction from the engagement position to the access position.

14. An amusement device seat assembly, comprising:
   a seat adapted to accommodate a passenger;
   a bar construction, said bar construction being moveable between an access position allowing passengers to take place in the seat, to a passenger fixation position, in which the passenger is fixed in the seat; and
   a locking device connected to the seat to lock the bar construction in the passenger fixation position, wherein the locking device comprises:
      an engagement device configured to engage and disengage with the bar construction, comprising a gripping device being moveable between an opened, unlocked position, and a closed, locked position;
      a guide for the engagement device allowing the engagement device to assume an engagement position between the access position and the passenger fixation position, and allowing the engagement device and the engaged bar construction to move between the engagement position and the passenger fixation position; and a fixation device configured to fix the engagement device and the engaged bar construction at multiple passenger fixation positions along the guide to accommodate passengers of different sizes.

15. The assembly according to claim 14, wherein the engagement device is fixed with respect to the bar construction when the engagement device and the engaged bar construction are moved between the engagement position and the passenger fixation position.

16. The assembly according to claim 14, wherein the gripping device is designed as pivotable claws.

17. An amusement device seat assembly, comprising:
a seat adapted to accommodate a passenger, comprising an arm support,
a bar construction, said bar construction being moveable between an access position allowing passengers to take place in the seat, to a passenger fixation position, in which the passenger is fixed in the seat; and
a locking device connected to the seat to lock the bar construction in the passenger fixation position, wherein the locking device comprises:
an engagement device connected to the arm support and configured to engage and disengage with the bar construction;
a guide for the engagement device allowing the engagement device to assume an engagement position between the access position and the passenger fixation position, and allowing the engagement device and the engaged bar construction to move between the engagement position and the passenger fixation position; and
a fixation device configured to fix the engagement device and the engaged bar construction at multiple passenger fixation positions along the guide to accommodate passengers of different sizes.

18. The assembly according to claim 17, wherein the engagement device is fixed with respect to the bar construction when the engagement device and the engaged bar construction are moved between the engagement position and the passenger fixation position.

19. An amusement device seat assembly, comprising:
a seat adapted to accommodate a passenger;
a bar construction comprising a hip bar and one or more pivot arms extending between the hip bar and a pivot axis, the bar construction being pivotable between an access position allowing passengers to take place in the seat, to a passenger fixation position, in which the passenger is fixed in the seat; and
a locking assembly connected to the seat to lock the bar construction in the passenger fixation position, wherein the locking assembly comprises two locking devices, wherein each locking device comprises:
an engagement device configured to engage and disengage with the hip bar and/or the one or more pivot arms;
a guide for the engagement device allowing the engagement device to assume an engagement position between the access position and the passenger fixation position, and allowing the engagement device and the engaged bar construction to move between the engagement position and the passenger fixation position; and
a fixation device configured to fix the engagement device and the engaged bar construction at multiple passenger fixation positions along the guide to accommodate passengers of different sizes.

20. The assembly according to claim 19, wherein the engagement device is fixed with respect to the bar construction when the engagement device and the engaged bar construction are moved between the engagement position and the passenger fixation position.

21. The assembly according to claim 19, wherein the hip bar comprises two protruding parts, having a smaller diameter than the hip bar itself, and wherein the engagement device engages with the protruding parts.

22. The assembly according to claim 1, wherein the engagement device is fixed with respect to the bar construction when the engagement device, engaged with the bar construction, is moved in the locking direction from the engagement position to the passenger fixation position and vice versa.

* * * * *